US010523633B2

(12) United States Patent
Claes

(10) Patent No.: US 10,523,633 B2
(45) Date of Patent: Dec. 31, 2019

(54) METHOD OF COMMUNICATING BETWEEN SECURED COMPUTER SYSTEMS, A COMPUTER NETWORK INFRASTRUCTURE AND A COMPUTER PROGRAM PRODUCT

(71) Applicant: Fujitsu Technology Solutions Intellectual Property GmbH, München (DE)

(72) Inventor: Heinz-Josef Claes, Ronneburg (DE)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 0 days.

(21) Appl. No.: 15/315,912

(22) PCT Filed: Jun. 1, 2015

(86) PCT No.: PCT/EP2015/062155
§ 371 (c)(1),
(2) Date: Dec. 2, 2016

(87) PCT Pub. No.: WO2015/185507
PCT Pub. Date: Dec. 10, 2015

(65) Prior Publication Data
US 2017/0104719 A1 Apr. 13, 2017

(30) Foreign Application Priority Data

Jun. 3, 2014 (DE) .................. 10 2014 107 790
Aug. 29, 2014 (DE) .................. 10 2014 112 466

(51) Int. Cl.
*H04L 29/06* (2006.01)
(52) U.S. Cl.
CPC ........ *H04L 63/0209* (2013.01); *H04L 63/029* (2013.01); *H04L 63/145* (2013.01); *H04L 63/1441* (2013.01); *H04L 63/0281* (2013.01)

(58) Field of Classification Search
CPC ............. H04L 63/0209; H04L 63/1441; H04L 63/0281; H04L 29/06; H04L 9/00; H04L 12/28; H04L 9/32; H04L 12/701
See application file for complete search history.

(56) References Cited

U.S. PATENT DOCUMENTS 8,116,238 B2 * 2/2012 Ozluturk ............... H04W 88/06
370/278
2004/0088409 A1 5/2004 Braemer et al.
(Continued)

FOREIGN PATENT DOCUMENTS

DE 10 2004 034 902 B3 9/2005
JP 2008-131137 A 6/2008
(Continued)

OTHER PUBLICATIONS

Notice of Reason(s) for Rejection dated Feb. 6, 2018, of corresponding Japanese Application No. 2016-571085, along with an English translation.
(Continued)

*Primary Examiner* — Jason K Gee
*Assistant Examiner* — Ka Shan Choy
(74) *Attorney, Agent, or Firm* — DLA Piper LLP (US)

(57) ABSTRACT

A method communicates between secured computer systems in a computer network infrastructure. Data packets are transmitted between a plurality from a group of processing computer systems, wherein such a transmission is performed by at least one broker computer system. The data packets are advantageously routed via at least one relay system connected upstream or downstream of the broker computer system in a transmission path of the data packets. All from the group of processing computer systems keep predetermined network ports at least temporarily closed so that access to a respective processing computer system via a network by the network ports is prevented. The relay system
(Continued)

keeps predetermined network ports closed at least to the broker computer system, which has the relay system connected downstream so that access to the relay system via a network by the network ports is prevented.

16 Claims, 5 Drawing Sheets

(56) References Cited

U.S. PATENT DOCUMENTS

| | | | |
|---|---|---|---|
| 2007/0220154 A1* | 9/2007 | El Husseini | H04L 63/0281 709/227 |
| 2009/0106834 A1* | 4/2009 | Borzycki | H04L 63/166 726/21 |
| 2009/0319674 A1* | 12/2009 | Yahyaoui | H04L 29/12528 709/228 |
| 2010/0205313 A1* | 8/2010 | Boire-Lavigne | H04L 29/125 709/228 |
| 2012/0311690 A1* | 12/2012 | Ellis | G06F 21/50 726/11 |

FOREIGN PATENT DOCUMENTS

| | | |
|---|---|---|
| JP | 2013-201621 A | 10/2013 |
| WO | 2008/004248 A1 | 1/2008 |
| WO | WO 2008004248 A1 * | 1/2008 ............ H04L 12/64 |

OTHER PUBLICATIONS

Al-Bahadili, H. et al., "Network Security Using Hybrid Port Knocking", *IJCSNS International Journal of Computer Science and Network Security*, vol. 10, No. 8, Aug. 2010, pp. 8-12.

Ali, F. H. M. et al., "Simple Port Knocking Method: Against TCP Replay Attack and Port Scanning", *2012 International Conference on Cyber Security, Cyber Warfare and Digital Forensic (CyberSec)*, IEEE Conference Publications, 2012, pp. 247-252.

Liew, J.-H. et al., "One-Time Knocking Framework using SPA and IPsec", *2010 2$^{nd}$ International Conference on Education Technology and Computer (ICETC)*, IEEE Conference Publications, vol. 5, 2010, pp. V5-209-V5-213.

Son, S. et al., "CODO: Firewall Traversal by Cooperative On-Demand Opening", *14th IEEE International Symposium on High Performance Distributed Computing*, Jul. 2005, pp. 233-242.

* cited by examiner

METHOD OF COMMUNICATING BETWEEN SECURED COMPUTER SYSTEMS, A COMPUTER NETWORK INFRASTRUCTURE AND A COMPUTER PROGRAM PRODUCT

TECHNICAL FIELD

This disclosure relates to a method of communicating between secured computer systems in a computer network infrastructure, a corresponding computer network infrastructure and a computer program product that performs such a method.

BACKGROUND

Distributed computer networks and so-called computer network infrastructures, respectively, describe a multitude of computer systems which can communicate with each other via data connections. Confidential content is exchanged to some extent and non-authorized persons shall not have any access possibility to it. In particular in computer network infrastructures that include server-client-topologies, confidential data, e.g. customer data or user data, is exchanged between client and server, wherein third party access to the data has to be suppressed.

Conventional security strategies to increase data protection include provisions (processes to be respected) or regulations (rules or prohibitions) for third parties such as administrators, whereby only restricted or controlled access to confidential data shall be permitted.

On the other hand, technical measures are provided to or in the computer systems to prevent physical and/or logical access to computer systems and restrict access only to authorized persons.

However, such approaches to improving data protection promote data security, but come with the disadvantage that they usually do not constitute obligatory measures to prevent access to confidential data.

Furthermore, for the data exchange or communication among one another, common computer network infrastructures work with access possibilities, for example, via network, or possibilities of addressability of services within the computer systems, which make them vulnerable to external attacks. This is because, for services to be addressable, a running program is required on one or multiple network ports of a computer system. This running program constitutes a potential security gap for external attacks via network.

There is a risk that under certain circumstances an attacker (hacker), who gains access to a computer system, may possibly extend the attack across further computer systems in the computer network infrastructure and is able to continue it on other computer systems. On the other hand, communication structures are required in a computer network infrastructure for communication and processing of information between individual computer systems.

It could therefore be helpful to improve protection against attacks to computer systems in a computer network infrastructure by technical provisions, keep the impact or spread of attacks to distributed computer systems within the computer network infrastructure to a minimum and nevertheless provide a communication structure that ensures a satisfactory and safe forwarding of data within the computer network infrastructure, in particular an event control of individual computer systems.

SUMMARY

I provide a method of communicating between secured computer systems in a computer network infrastructure including transmitting data packets between a plurality from a group of processing computer systems by at least one broker computer system, wherein the data packets are routed via at least one relay system connected upstream or downstream of the broker computer system in a transmission path of the data packets, causing all from the group of the processing computer systems to at least temporarily keep predetermined network ports used for the method closed such that a connection establishment from the exterior is not permitted and thus access to a respective processing computer system via a network by the network ports is prevented, and causing the relay system to keep predetermined network ports used for the method closed at least toward the broker computer system, to which the relay system is connected upstream or downstream such that a connection establishment to the relay system is not permitted at least from the broker computer system and thus a corresponding access to the relay system via network by the network ports is prevented, wherein a processing computer system or the relay system are capable of establishing a connection to the broker computer system to store a data packet in the broker computer system or to fetch it from there.

I also provide a computer network infrastructure including a group of processing computer systems, at least one broker computer system, and at least one relay system, wherein the computer network infrastructure is configured such that data packets are transmittable along a predetermined transmission path between multiple processing computer systems by the broker computer system and the relay system, the relay system connects upstream or downstream of the broker computer system in the transmission path of the data packets, all processing computer systems include in each case an access control unit configured to keep predetermined network ports used for the method at least temporarily closed such that a connection establishment from the exterior is not permitted and thus access to a respective processing computer system via a network by the network ports is prevented, the relay system includes an access control unit configured to keep predetermined network ports used for the method closed at least toward the broker computer system, the relay system connected upstream or downstream to the broker computer system such that a connection establishment to the relay system is not permitted at least from the broker computer system and thus a corresponding access to the relay system via a network by the network ports is prevented, and the processing computer systems and the relay system are configured to establish a connection to the broker computer system to store a data packet in the broker computer system or to fetch it from there.

I further provide a computer program product configured to be executed on at least one computer system and, when executed, performs the method of communicating between secured computer systems in a computer network infrastructure including transmitting data packets between a plurality from a group of processing computer systems by at least one broker computer system, wherein the data packets are routed via at least one relay system connected upstream or downstream of the broker computer system in a transmission path of the data packets, causing all from the group of the processing computer systems to at least temporarily keep predetermined network ports used for the method closed such that a connection establishment from the exterior is not permitted and thus access to a respective processing computer system via a network by the network ports is prevented, and causing the relay system to keep predetermined network ports used for the method closed at least toward the broker computer system, to which the relay system is connected upstream or downstream such that a connection establishment to the relay system is not permitted at least from the broker computer system and thus a corresponding access to the relay system via network by the network ports is prevented, wherein a processing computer system or the relay system are capable of establishing a connection to the broker computer system to store a data packet in the broker computer system or to fetch it from there.

LIST OF REFERENCE NUMERALS

Figure 1:
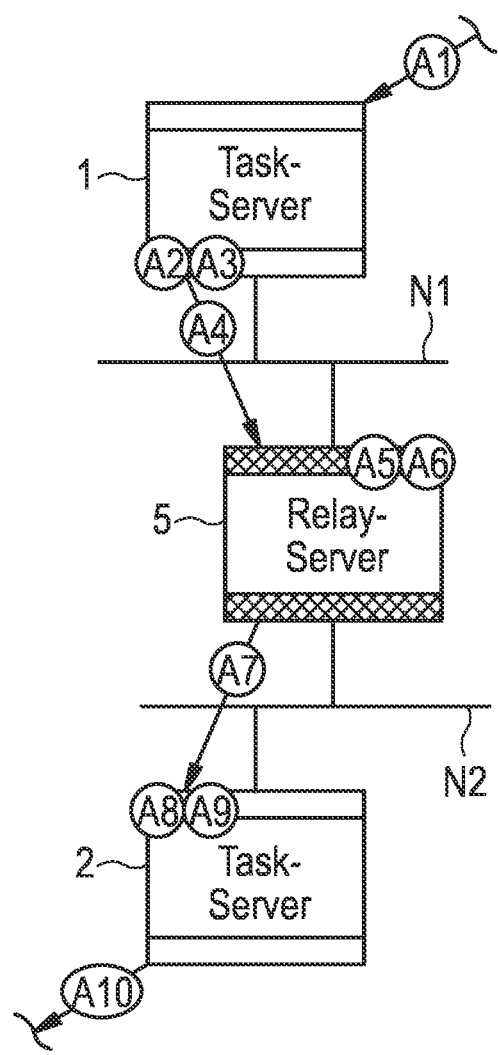
FIG. 1 is a schematic illustration of a part of a computer network infrastructure.

| | |
|---|---|
| 1-4 | task servers |
| 5-9 | relay servers |
| 10-18 | processing computer systems |
| A1-A10 | method steps |
| B1, B2 | method steps |
| C1, C2 | method steps |
| D1 | method step |
| E1-E3 | method steps |
| F1-F7 | method steps |
| N1-N9 | networks |
| P1-P4 | transmission protocols |
| SP | storage |
| Zone0-zone6 | security zones |

DETAILED DESCRIPTION

My method transmits data packets between a plurality from a group of processing computer systems, wherein such a transmission is performed by at least one broker computer system. The data packets are routed over at least one relay system connected upstream or downstream of the broker computer system in a transmission path of the data packets.

Advantageously, all from the group of processing computer systems at least temporarily keep predetermined network ports used for this method closed such that a connection establishment from the exterior is not permitted and thus access to a respective processing computer system via a network by the network ports is prevented. The relay system advantageously keeps predetermined network ports used for this method closed at least toward the broker computer system, to which the relay system is connected upstream or downstream such that a connection establishment to the relay system is not permitted at least from the broker computer system and thus a corresponding access to the relay system via network by the network ports is prevented. Nevertheless, a processing computer system or the relay system may establish a connection to the broker computer system to store a data packet in the broker computer system or to fetch it from there.

In such a communication method, the processing computer systems serve for the mutual transmission and processing of data packets. Processing of the data packets is effected locally in a respective processing computer system. The data packets are routed to a receiving processing computer system from a sending processing computer system within the computer network infrastructure via at least one broker computer system as well as at least one relay system. The relay system either connects upstream or downstream of the broker computer system in a transmission path of the data packets.

The broker computer system serves as a broker of the data packets, wherein the data packets can be stored on the broker computer system to forward the data along a transmission path within the computer network infrastructure and be fetched from there for further transport.

The relay system (just like the broker computer system) also performs forwarding of data packets within the computer network infrastructure. "Relay system" is to be understood as a forwarding system that may be designed as a relay server, possibly a modified router or the like, in the context of this method. In a constellation of the method described herein, a main function of the relay system advantageously is that the relay system transmits a data packet received by the relay system from a broker computer system or fetched by the relay system from a broker computer system, with the relay system being connected downstream of the broker computer system, directly to another computer system within the computer network infrastructure. In an alternative or additional constellation of the method described herein, the main function of the relay system advantageously is that the relay system transmits a data packet, received by the relay system from another computer system or fetched by the relay system from another computer system, with the relay system connected downstream of the computer system, directly to a broker computer system within the computer network infrastructure, which in turn connects downstream of the relay system.

In the method described herein, all computer systems from the group of processing computer systems act as encapsulated systems with closed network ports. Access to these computer systems via a network is not possible or significantly complicated at least under certain operating conditions (advantageously permanently while performing the method described herein).

"Predetermined network ports" means that all or only selected security-relevant network ports, e.g. network ports used for this method, are permanently or temporarily closed in each processing computer system.

This comes with the advantage that no programs or services need to be configured, started or be required on the processing computer system that listen to the respective network ports from the outside for the purpose of addressability or connection establishment and thus pose a potential security gap (e.g. by a buffer overflow or so-called denial-of-service attacks). Thus, in this context, "closed network ports" means that the ports are not "listening ports", i.e. a connection establishment from the exterior is not permitted. A third party (hacker) will not be able to authenticate or log-in to a respective processing computer system externally via network, e.g. via a secure shell (SSH) daemon in UNIX-based systems, or perform special actions on a processing computer system.

Nevertheless, local access to a respective processing computer system may be configured for a corresponding user group (e.g. for security personnel). However, local access to a corresponding processing computer system is prevented for other third parties.

Just as well, the relay system acts as an encapsulated system with closed network ports of the described type at least towards the broker computer system, the relay system being connected upstream or downstream of the broker computer system in terms of the method. As a result, access to the relay system via a network (at least from the broker computer system connected upstream or downstream) is neither possible at least under certain operating conditions (advantageously also permanently while performing the method described herein). All or only selected security-relevant network ports may be permanently or temporarily closed in the relay system as well.

Thus, through this encapsulation of the processing computer systems and the relay system, respectively, of the described manner, an attack via network is complicated because a decisive attacking option is prevented, namely running services or programs on listening network ports of the respective systems.

In addition, an encapsulation of the relay system complicates a spread of an attack in a transmission path from computer systems connected upstream the relay system to computer systems connected downstream the relay system. The relay system is a kind of security hurdle or blockage, wherein an (unauthorized) access to the relay system and/or to computer systems connected downstream in the respective transmission path is significantly more complicated due to a lack of an addressable program or service on the closed network ports of the relay system. In the method described, the relay system serves as a kind of "router" which, however, in contrast to conventional routers or routing systems, does not permit a connection establishment from the exterior on the closed network ports via network. Thus, the relay system provides an effective protection from unauthorized intrusions. Against this background, the relay system may be referred to as an "anti-router".

This way, in the method described, in particular security-relevant data, which is processed locally on the respective processing computer systems, is protected against attacks to the processing computer systems. In addition, the relay system prevents or blocks an attack from spreading to distributed computer systems within the computer network infrastructure.

However, for the communication and forwarding of data packets within the computer network infrastructure, in contrast to the processing computer systems and the relay system, the method permits external access to the at least one broker computer system. The broker computer system is accessible via network as an "open" system with at least one addressable open (listening) network port. This means that programs are running and/or applications are prepared on the broker computer system so that a processing computer system or the at least one relay system may each have access to the broker computer system and are capable of establishing a connection to the broker computer system to store a data packet in the broker computer system or to fetch it from there according to the described method (via an "established" connection then). In terms of security, such an "open" broker computer system is to be assessed just like a traditional, specifically secured computer system.

Thus, the at least one broker computer system serves as a (secured, but addressable) broker for communication between the processing computer systems and the relay system, which, however, are encapsulated per se.

Data packets may advantageously include information to execute predetermined processes in a respective processing computer system. Such processes may include, for example:
storing and/or processing of transmitted data,
re-starting a program,
recovering backup data, or
the instruction to physical access or SSH access to a processing computer system.

A secured access to a processing computer system by the method described herein will later be explained in greater detail in one specific aspect.

Corresponding combinations of the above-mentioned processes, actions and instructions are possible, of course. Data packets can be supplemented with certain information along a transmission path between processing computer systems within the computer network infrastructure so that an event control of a target computer system or a transmission of information between processing computer systems as well as a flexible adding of information during the process for the control thereof is enabled.

In the described method, data packets are fundamentally different from a pure command of a processing computer system to another processing computer system because a command requires a continuously running, externally open and thus vulnerable program or a corresponding service on the side of the receiving processing computer system for the evaluation of the command. However, as described above, such a program or corresponding service may be omitted in this method due to lack of access via network to open (listening) network ports of a corresponding processing computer system. The same applies with regard to the relay system of the computer network infrastructure described herein.

For transmission of data packets to a processing computer system or to the relay system, a process may be triggered that requests a selected data packet in the broker computer system and transmits it in an automated manner from the broker computer system to a processing computer system or the relay system. Advantageously, the automated transmission of data packets from the broker computer system to a processing computer system or the relay system is designed such that a third party does not have any external influence on it and thus a risk of manipulation of one of the processing computer systems or the relay system via data packets is excluded. Data packets can be encrypted, for example. A (differing) encryption can be applied multiple times to parts of the data packets or to the entire data packets as well. Validity of the data packets can be checked in the respective receiving computer system and a corresponding process can be executed. Validity of the data packets can be checked by signatures with which the data packets were signed.

The relay system may be connected immediately upstream or downstream of a processing computer system in a transmission path of data packets (i.e. without interconnected further broker computer system). In this case, the relay system has at least one network port open toward this processing computer system so that this processing computer system is capable of establishing a connection to the relay system to store a data packet in the relay system or to fetch it from there. This is needed so that a communication between the processing computer system (with closed network ports), encapsulated per se, and the relay system is possible. However, the relay system keeps decisive network ports closed towards other broker computer systems in a transmission path of data packets, as described above. Thus, in this example, the relay system is a mixed open and closed system, a "hybrid" system, respectively.

Advantageously, the relay system, via which the data packets are routed, may interconnect between two broker computer systems in the transmission path of the data packets, wherein the relay system keeps predetermined network ports used for this method closed, in the sense described above, towards one (or both) of the broker computer systems, between which the relay system is interconnected. Thus, in such a communication method, at least two broker computer systems may be provided, wherein one is arranged before the relay system in the transmission path of data packets and one is arranged behind the relay system. If the network ports are closed towards all broker computer systems connected up- and downstream thereof, the relay system provides a routing function but does not permit any connection establishment from the exterior via network. Thus, the relay system is an effective protection from unauthorized intrusion in all transmission directions (based upon all broker computer systems involved).

In general, in the computer network infrastructure, data packets are transmitted between the computer systems using a transmission protocol. In the topology of relay systems or processing computer systems described herein with network ports closed in one or multiple directions and with broker computer systems having addressable ("listing") network ports, this results in different effects depending on whether a data packet is sent to a computer system (e.g. in a transmission from an addressable processing computer system or relay system to an addressable broker computer system) or whether a data packet is fetched from a computer system (e.g. in a transmission from an addressable broker computer system to a processing computer system or a relay system). This means that the different scenarios of "fetching" a data packet and "sending" a data packet are differently presented in a transmission protocol. Thus, an attack to a transmission protocol requires manipulation of different security aspects for the different scenarios, which increases security.

For a further increase of security, the data packets are preferably transmitted by at least one first transmission protocol in the transmission path before the relay system, and transmitted by at least one second transmission protocol in the transmission path after the relay system, the second transmission protocol being different from the at least one first transmission protocol.

This achieves another security mechanism that prevents security problems in a single transmission protocol that may result in a failure of the security mechanism. Rather, for a successful attack, multiple different transmission protocols have to be attacked or be attackable for a transmission path between processing computer systems by the at least one broker computer system and the at least one relay system, which is significantly less unlikely and more exhausting than an attack to a single transmission protocol, respectively. This ensures a higher security than the use of only one single transmission protocol.

Thus, a relay system according to the described method does not only present a security hurdle due to the negation of a connection establishment from the exterior via network (blocking of attacks beyond the relay system), but also defeats an attack on a predetermined transmission protocol in the transmission path upstream the relay system by a change to another different transmission protocol in the further transmission path downstream the relay system. In the method of the described type, optionally more than two different protocols (per transmission direction) can be used by a corresponding use of multiple relay systems.

Alternatively, or in addition to the above-described measures, it is possible in the method that the packet data is transmitted in the respective transmission path between two processing computer systems in a direction-depending manner across different transmission protocols. This means that not only a protocol change from a first transmission protocol upstream a relay system to a second transmission protocol downstream a relay system is effected with regard to a respective processing computer system, but that different transmission protocols are used across the relay system for different transmission directions as well.

Thus, in a relay system, four different transmission protocols can be used, in each case one transmission protocol upstream and downstream the relay system per transmission direction across the relay system. For example, with respect to a processing computer system, a send protocol S1 upstream the relay system and a send protocol S2 downstream the relay system, as well as a receive protocol E1 upstream the relay system and a receive protocol E2 downstream the relay system are discriminated.

Alternatively, or in addition, it is also possible to discriminate transmission protocols in terms of the fact that data packets are directly transmitted to a broker computer system (to which a connection establishment from the exterior is possible), or data packets are fetched by a processing computer system or the at least one relay system (to which a connection establishment from the exterior is not possible) only indirectly after a connection establishment to the broker computer system.

Advantageously, in the method of the type described, the data packets are transmitted by at least one first network in the transmission path upstream the/a relay system, and transmitted by at least one second network in the transmission path downstream the/a relay system, the second network being different from the at least one first network.

Alternatively, or in addition, respectively different networks are disposed between a processing computer system and a broker computer system linked for communication and between the respective broker computer system and a relay system downstream in the communication path, respectively. This way, the computer network infrastructure can be divided into different security zones, wherein the security zones are blocked against an intrusion of an (internal or external) attacker from another security zone. This also increases security within the computer network infrastructure and lowers the probability of a successful attack to individual computer systems or the probability of a spread of an attack to further systems within the infrastructure or drastically complicates such attacks.

Advantageously, in the method of the type described, the transmission of data packets to the relay system or to a processing computer system comprises the following steps:

sending a predetermined data sequence to the relay system or the processing computer system, wherein the predetermined network ports of the relay system or the processing computer system are closed and wherein the data sequence addresses one or multiple network ports of the relay system or of the processing computer system in a predetermined order, verifying the sent data sequence with a predefined sequence in the relay system or in the processing computer system, as well as causing transmission of the data packets by the relay system or by the processing computer system if the verification of the sent data sequence is positive, wherein the relay system or the processing computer system per se establishes a connection to the broker computer system and fetches the data packets.

The additional method steps indicated herein can be executed in general toward all computer systems that keep respective network ports closed so that a communication, in particular transmission of data packets within the computer network infrastructure, is still possible.

The measures provide the advantage that basically the network ports (the ones relevant to the method) of a processing computer system or of the at least one relay system—in the context described above—are closed and block a connection establishment from the exterior to a processing computer system or to the relay system, or significantly complicate manipulative access. Causing transmission of the data packets by a processing computer system or the relay system can be an automated process for the transmission of the respective data packets to the processing computer system or the relay system (e.g. using the UNIX-based "Secure Copy, scp" command). According to the process, the processing computer system or the relay system establishes a connection to the broker computer system and fetches the data packets. This process can be started by a processing computer system or the relay system after a predetermined data sequence has been sent to a processing computer system or the relay system, if this data sequence matches a predefined sequence. The IP address of the sequence-sending computer system can be predefined in the processing computer system or the relay system to be static or be taken dynamically from IP addresses of possible sequence-sending computer systems known to the kernel of the processing computer system or the relay system.

Such a method is known as "port-knocking". The above-mentioned steps can be performed by a so-called knock daemon, i.e. a program that enables port knocking. The knock daemon listens to the network ports of a processing computer system or the relay system, verifies the data sequence sent to the processing computer system or to the relay system, and causes, if need be, a controlled transmission of the respective data packets from the broker computer system to the processing computer system (e.g. by starting a script/program) if the sent data sequence matches the predefined sequence. The above-described process thus allows activation by a processing computer system or the relay system, which address a corresponding service on a broker computer system via network, transmission/copying of data packets from the broker computer system to the processing computer system or the relay system without that the processing computer system or the relay system needs to provide an open network port having an addressable program to that end.

Alternatively, or in addition to the described port knocking, it is also possible that a processing computer system or the relay system poll the broker computer system at regular intervals as to whether one or multiple data packets to be exchanged are present. If this is true, a corresponding transmission of the data packets from the broker computer system to the processing computer system or the relay system can be initiated, as described above. It is also possible that the processing computer system or the relay system perform a polling, if, for example, a certain time period in which port-knocking was not performed by the broker computer system, is exceeded. Port knocking problems can be detected this way and the proper function of the computer network infrastructure is maintained.

Hereinafter, secure access to a processing computer system through another processing computer system by the method described is to be explained, which (at least in parts) uses the above-described measures and method steps.

To that end, preferably in the group of the processing computer systems, discrimination is made between at least
one key computer system,
one access computer system, and
one target computer system.

First, a security file is generated for secured access to the target computer system in the key computer system. Subsequently, the security file is transmitted along a defined communication path from the key computer system to the access computer system. Transmission of the security file is advantageously effected by the at least one broker computer system, which in contrast to the key computer system and access computer system, comprises opened network ports and is addressable via network for connection establishment. Thus, the security file can be directly transmitted from the key computer system to the broker computer system and fetched from there in an automated manner to the access computer system (e.g. by a port knocking process initiated by the broker computer system, as described above).

It is also possible to integrate a relay system according to the above-described functionality in the communication path between the key computer system, the broker computer system and the access computer system. This provides the advantage that various security zones can be differentiated, which increases security against attacks to individual computer system or against a spread of an attack within the computer network infrastructure.

However, it is also possible to perform a transmission of the security file from the key computer system to the access computer system without a relay system being interconnected. In this case, merely the key computer system, at least one broker computer system as well as the access computer system are involved in the transmission of the security file from the key computer system to the access computer system.

Once the security file has been transmitted to the access computer system, this system verifies authentication information requested in advance by the security file. Authentication information may be identification data of predetermined users, for example, which are capable or allowed to authenticate on the access computer system for access to the target computer system.

Such identification data may be personal biometrical data (finger print, hand vein scan, retinal scan, voice recognition or the like) and/or a temporary password (assigned by a separate security entity, for example) or a person-related password or another key (e.g. by a chip card, ID card, smartphone, RFID tag or the like).

This authentication information is requested for authentication on the access computer system (e.g. by a terminal configured to that end) and subsequently compared to information stored in the security file. For example, the security file contains corresponding authentication information, which is assigned and set by the key computer system for predetermined users who are allowed access. If the requested authentication information matches the information within the security file, users may successfully authenticate on the access computer system.

The access computer system can be secured against physical access in a special manner, e.g. be located in a particularly protected area. For example, the access computer system may be configured in a high-security rack and physically accessible only with a separate access permission. Logical access to the access computer system is preferably only effected via restricted rights (e.g. via a so-called restricted shell) to prevent manipulation options at the access computer system, if possible. Furthermore, common security measures are to be provided at the access computer system (e.g. data system encryptions).

After a successful authentication of all persons authorized to access (enforced n-eye principle) on the access computer system according to the above-described measures, the target computer system is unlocked for access by the access computer system as an additional security measure. Unlocking the target computer system preferably comprises opening a selective network port intended for this method on the target computer system. Unlocking may be restricted to the IP address of the access computer system, possibly supplemented by a predetermined source port.

If the verification of the authentication information by the access computer system has been successful, the actual unlocking of the target computer system is thus effected in a further step so that the target computer system can be accessed by the access computer system.

By involving and using a communication method of the above type, secure access to a processing computer system (target computer system) is possible by another computer system (access computer system).

Preferably, in the group of the processing computer systems according to the specifically described method for access to the target computer system, discrimination is additionally made regarding at least one authorization computer system. The security file is transmitted from the key computer system to the authorization computer system at least by one broker computer system. In the authorization computer system, the security file can be supplemented by predetermined access information and/or signed with a private key. Subsequently, the security file is further transmitted in the communication path toward the access computer system.

Supplementing the security file by predetermined access information may include selection of certain persons from a stored list of permitted persons or storing identification data of selected persons, for example. Such a local signature of the security file with a private key in the authorization computer system assumes the function of confirming the security file and information possibly contained therein.

It is possible to transmit the security file to multiple authorization computer systems within the computer network infrastructure to perform a linked or cascaded signing in this way. This provides the advantage that multiple security authorities are necessarily involved in the process and the risk of manipulation of the security file can be significantly reduced. An attack to the computer network infrastructure for the manipulation of a security file for manipulated access to the target computer system would thus require taking over each and every of the authorization computer systems and thus a falsification of a cumulated signature.

Access to a target computer system by an access computer system can very securely be controlled by one or multiple authorization computer systems.

My computer network infrastructure may comprise at least:
a group of processing computer systems,
at least one broker computer system, and
at least one relay system.

The computer network infrastructure is configured such that data packets are transmittable along a predetermined transmission path between multiple processing computer systems by the at least one broker computer system and the at least one relay system. The relay system connects downstream or upstream of the at least one broker computer system in the transmission path of the data packets. Furthermore, all processing computer systems comprise in each case an access control unit, configured to keep predetermined network ports used for this method closed such that a connection establishment from the exterior is not permitted and thus access to a respective processing computer system via a network by the network ports is prevented. The at least one relay system also comprises an access control unit configured to keep predetermined network ports used for this method closed at least toward the broker computer system, with the relay system being connected upstream or downstream thereof such that at least from the broker computer system, a connection establishment to the relay system is not permitted and thus access to the relay system via a network by the network ports is prevented. The processing computer systems and the relay system are configured to establish a connection to the broker computer system to store a data packet in the broker computer system or to fetch it from there.

Such a computer network infrastructure allows communication between processing computer systems, specifically, an exchange of packet data although all processing computer systems keep network ports closed outwards—as described above—so that a running program or running service on opened network ports for a connection establishment from the exterior is not required and configured, which would enable a potential security gap for attackers via network.

Rather, all processing computer systems cannot be externally addressed or accessed through closed network ports and do not permit connection establishment from the exterior. However, the processing computer system may access the at least one broker computer system, which, as an open system—in the sense described above—is externally addressable via a running program or a running service with at least one network port opened to that end. This way, data packets can be stored on the broker computer system from a processing computer system or be fetched from there.

In addition, the relay system—in the sense described above—acts as a kind of "router" for the data packets within the computer network infrastructure, wherein however the relay system also keeps predetermined network ports closed toward the broker computer system, the relay system being connected downstream the broker computer system. As a result, the relay system is not addressable via network from at least one broker computer system because a running program or a running service is not configured on opened network ports even on the relay system. Thus, the relay system is an "anti-router". However, the relay system can access the broker computer system and establish a connection to fetch data packets from there and forward them to a computer system that is connected downstream of the relay system (e.g. a target processing computer system).

Due to encapsulation of the relay system toward one or multiple broker computer systems with the computer network infrastructure present at least in one transmission direction, an additional security hurdle is created that suppresses a spread of an attack to a computer system connected downstream the relay system within the computer network infrastructure. Thus, within the computer network infrastructure, the relay system serves as a kind of router, which in contrast to conventional routers, does not permit any connection establishment at least via the broker computer system connected upstream the relay system ("anti-router"). In this transmission direction, the relay system thus provides an effective protection from unauthorized intrusion, in particular in network paths downstream the relay system.

The relay system may be a relay server (as described above in the context of the method), a modified router or the like, if applicable. Advantageously, the relay system routes a data packet received by the relay system from a broker computer system, the relay system being connected downstream this broker computer system, directly to another (broker) computer system, which in turn is connected downstream the relay system. In a processing computer system connected immediately downstream the relay system, a process may be triggered by the processing computer system, which—as described above—fetches a data packet from the relay system.

In one example, the relay system is connected immediately downstream or upstream of a processing computer system in a transmission path of the data packets, wherein the access control unit of the relay system is configured such that the relay system has at least one network port opened toward this processing computer system so that the processing computer system can establish a connection to the relay system to store a data packet in the relay system or fetch it from there.

Preferably, in another example, the computer network infrastructure of the described type comprises at least two broker computer systems, wherein the at least one relay system interconnects between the broker computer systems in the transmission path of the data packets. The access control unit of the at least one relay system is configured to keep predetermined network ports used for this method closed at least toward one of the broker computer systems between which the relay system is interconnected.

In particular in closed network ports of the relay system toward both broker computer systems, between which the relay system interconnects, there is an advantage that the relay system provides effective protection from unauthorized intrusion in both directions (based upon both broker computer systems). In particular, a spread of an attack to one of the broker computer systems is prevented within the computer network infrastructure by the relay system.

Preferably, the computer network infrastructure is designed such that data packets are transmittable in the transmission path upstream the at least one relay system and downstream the at least one relay system using different transmission protocols. As described above in the context of the method, a change of transmission protocols is a further security measure so that an attack to a single transmission protocol will not cause a failing of the security mechanism of the computer network infrastructure and remains unsuccessful because the protocol is changed to a different protocol downstream the relay system. If more than two relay systems are used, more than two transmission protocols can be used. Just as well, transmission protocols can be differentiated depending on the direction.

Advantageously, the computer network infrastructure comprises multiple networks, wherein computer systems connect by at least one first network in the transmission path upstream the/a relay system and wherein computer systems connect by at least one second network in the transmission path upstream the/a relay system, the second network being different from the at least one first network. Thus, the relay system forms an encapsulated broker between different networks so that different security zones can be differentiated within the computer network infrastructure. This also increases the security within the computer network infrastructure.

Advantageously, the computer network infrastructure of the described type is configured to perform a method of the above-described type.

All advantageous aspects, features as well as measures of the above described method correspond to structural features of the computer network infrastructure and are applied in analogy. Vice versa, all structural features of the computer network infrastructure explained herein can also be applied to a method of the type described above.

Advantageously, the computer network infrastructure is configured to perform a secured access of a processing computer system to another processing computer system. Advantageously, the group of processing computer systems comprises, within the computer network infrastructure, at least:

one key computer system,
one access computer system, and
one target computer system.

The key computer system is configured to generate a security file for a secured access to the target computer system and transmit the security file along a predetermined communication path to the access computer system. Such a transmission can be performed by the at least one broker computer system. The security file is transmittable from the key computer system (which comprises closed network ports per se) to the broker computer system (having a running program or a running service configured on an open network port for a connection establishment). Furthermore, the security file is fetchable by the access of the access computer system, which also has closed network ports per se, to the broker computer system through the access computer system.

Optionally, a transmission of the security file from the key computer system to the access computer system may be routed via at least one relay system of the described type. This provides the above-described advantages of encapsulating different security zones within the computer network infrastructure.

However, it is also possible to perform a corresponding transmission of the security file without a corresponding relay system. In this case, merely the key computer system, at least one broker computer system as well as the access computer system are involved in a corresponding transmission of the security file.

The access computer system is configured to prompt input of authentication information on the access computer system and verify this authentication information by the security file.

Advantageously, the access computer system is prepared for the input of biometrical data of a user (e.g. finger print, hand vein scan, voice recognition or the like) or input of a temporary or person-related password or other keys (e.g. also by a chip card, ID card, smart phone, RFID tag or the like). Such an input can be configured on a terminal of the access computer system, on which the access computer system expects input and requests corresponding information.

The target computer system is configured to unlock a selective network port for access to the target computer system by the access computer system depending on a verification of the authentication information by the access computer system. Such unlocking may be restricted, for example, to the IP address and possibly a predetermined network port of the access computer system. Then, the access computer system may selectively access the target computer system by the unlocked network port so that an authenticated user group obtains access to the target computer system by the access computer system. It is possible to permit an unlocking only temporarily.

Advantageously, the group of the processing computer systems additionally comprises at least one authorization computer system within the computer network infrastructure. The authorization computer system is configured to supplement the security file with predetermined access information and/or to sign the security file after a transmission of the security file to the authorization computer system, as well as to transmit the security file further in the communication path.

Advantageously, the authorization computer system is interposed between the key computer system and the access computer system in the transmission path of the security file. This way, the authorization computer system allows a corresponding processing of the security file (e.g. incorporating further information or confirming the security file, local signing or the like). The security file may receive a temporary password, for example, or other features for access to the access computer system in encrypted form and thus allow a one-time and individual access.

I further provide a computer program product configured to be executed on at least one computer system that performs a method of the type described above when executed. This way, an automated implementation of the method on one or multiple computer systems, advantageously within a described computer network infrastructure, is enabled.

Further advantages are disclosed in the following description of the figures. My method, infrastructure and product will be explained in greater detail by drawings.

FIG. 1 shows a schematic illustration of at least a part of a computer network infrastructure for the communication between multiple computer systems and for the transmission of data packets between these computer systems. The topology according to FIG. 1 comprises two broker computer systems, i.e. a task server 1 and a task server 2. A forwarding computer system, namely a so-called relay server 5, connects between these two computer systems. A data connection between task server 1 and relay server 5 is ensured by a first network N1. A data connection between the relay server 5 and the task server 2 is ensured by a second network N2.

The task server 1 and the task server 2 are open systems. This means that they each comprise at least one network port opened for further purposes on which a running program or a running service is configured for external addressability and connection establishment via network.

In contrast, the relay server 5 is an encapsulated system having network ports closed toward both the task server 1 and task server 2 (see cross-hatched input/output levels on the relay server 5). This means that on the relay server 5 no running programs or services are available on an opened network port so that the relay server 5 does not permit any connection establishment from both directions (both based upon task server 1 and based upon task server 2) via the networks N1 and N2. Thus, the relay server 5 separates the networks N1 and N2. Nevertheless, the relay server acts as a kind of broker ("anti-router") between the two networks N1 and N2 for the transmission of data packets between the task server 1 and the task server 2.

FIG. 1 shows multiple method steps A1 to A10 for the transmission of data packets within the structure, which will be explained in greater detail hereinafter.

In a first step A1, a data packet is transmitted from an entity outside the structure shown in FIG. 1 to the task server 1 and stored there. In step A2, an internal processing is effected in the task server 1, e.g. storing a transport route of the data packet. In step A3, a routing to further computer systems within the structure according to FIG. 1 is determined in the task server 1 and a port knocking process is performed toward the relay server 5 via network N1. To that end, the task server 1 sends a predetermined data sequence via the network N1, which addresses predetermined network ports on the relay system 5. A knock daemon in the relay server 5 compares the received data sequence with a predetermined sequence and causes starting of a process if the sequences match.

This process comprises a connection establishment through the relay server 5 on the addressable task server 1 and an automated transmission of the data packet from the task server 1 to the relay server 5. Such a transmission can be effected by the UNIX based command "Secure Copy", scp, for example. Then, the data packet is transmitted from the task server 1 to the relay server 5 via network N1 by the established connection in step A4.

In step A5, a further processing within the relay server 5 is effected, e.g. likewise storing a transport route. In step A6, another routing is determined in the relay server 5, wherein the further transport of the data packet to the addressable task server 2 via network N2 is effected in step A7. In the task server 2 a further processing is effected in step A8, e.g. likewise storing a transport route, as well as in step A9 determining a further routing to computer systems outside the structure shown in FIG. 1. Finally, in step A10, a corresponding further transport of the data packet can be effected.

The structure according to FIG. 1 thus shows three broker computer systems, task server 1, task server 2 as well as relay server 5, which are configured as a topology with mixed opened and closed network ports. This way, a routing of data packets via the relay server 5 is possible, wherein the relay server 5 simultaneously enables encapsulation of the task server 1 of network N1 toward the task server 2 of network N2 and vice versa. Thus, an attack to task server 1 via network N1 and the relay server 5 can be spread to network N2 and the task server 2 only with considerable effort and is significantly complicated compared to conventional infrastructures. The same applies to task server 2 in the direction of task server 1. This way, the relay server 5 forms a secured "node" within the computer network infrastructure. Nevertheless, a further transport of data packets within the infrastructure is enabled by the described method steps.

Figure 2A:
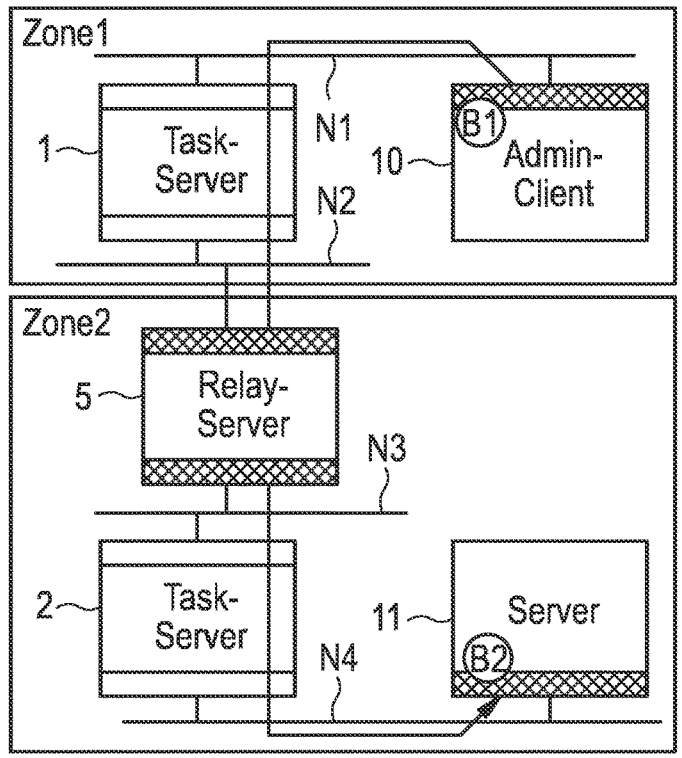
FIG. 2A is a schematic illustration of a computer network infrastructure with different security zones.

FIG. 2A shows a schematic illustration of a computer network infrastructure, which comprises components according to FIG. 1, inter alia. In particular, a task server 1 is connected to a relay server 5 via a network N2, while the relay server 5 is connected to a task server 2 via a network N3. In addition, two processing computer systems are configured, namely a so-called admin client 10 and a further server 11. The admin client 10 is connected to the task server 1 via a network N1, while the server 11 connects to the task server 2 via a network N4.

Admin client 10 and task server 1 are configured in a zone 1, while relay server 5, task server 2 and server 11 are configured in a separate zone 2 (physical separation).

The two processing computer system, admin client 10 and server 11 comprise closed network ports (see cross-hatched input/output levels), on which no running program or no running service for a connection establishment via the network N1 or the network N4 from the respective task server 1 or 2 is possible. This way, admin client 10 and server 11 are encapsulated systems (similar to the behavior of the relay server 5 in this context). The relay server 5 cooperates with the task servers 1 and 2 according to FIG. 2 in the same way as described in context with FIG. 1.

Starting at the admin 10, a data packet can be stored on the task server 1 via network N1. For example, the admin client 10 may locally initialize a process (task) in a step B1, which is to be executed on the server 11 in a step B2. For example, this process can be defined and set in a task file, which is transferred to the server 11 via the topology of the task server 1, relay server 5 and task server 2, which is analyzed there and a corresponding process is triggered by the task file.

For the transmission of the task file from task server 1 of zone 1 to the relay server 5 in zone 2 and finally to task server 2, the method described according to FIG. 1 is used. For the transmission of the task file to the server 11, task server 2 finally performs a port-knocking process toward server 11 via network N4 so that this server fetches the task file from the task server 2 and locally executes it in a corresponding process in step B2.

FIG. 2A illustrates the advantage of the relay server 5 for the separation of various security zones (zone 1 and zone 2). For example, workstations (admin client 10) may be configured in zone 1, to which administrators have physical/logical access. In contrast, a computing center (server 11) is configured in zone 2, for example, on which secure data is logically processed. For the control of the computing center, an administrator of zone 1 may initiate a process which is transported in zone 2 in the form of an instruction by the relay server 5, for example, and which can be locally processed there.

For example, the security zones zone 1 and zone 2 can form physically and/or logically separated security zones. Individual computer systems can be configured separate from one another in high-security racks having a corresponding physical access protection, for example. A logical access protection or a logical encapsulation of the two security zones results from the relay server 5.

Thus, administrators or even internal and external attackers dominating the admin client 10 do not have access from zone 1 to the server 11 in zone 2 by the networks N1 and N2 (via task server 1), the server 11 being blocked by the relay server 5. On the other hand, an employee or internal/external attacker (hacker), who has hacked into the server 11 in zone 2, does not have access to the admin client 10 in zone 1 by the networks N3 and N4 (via the task server 2) since the admin client 10 is blocked by the relay server 5. The possibility of intruding from one security zone into another security zone is thus drastically complicated (or unlikely) from both sides by the relay server 5.

Figure 2B:
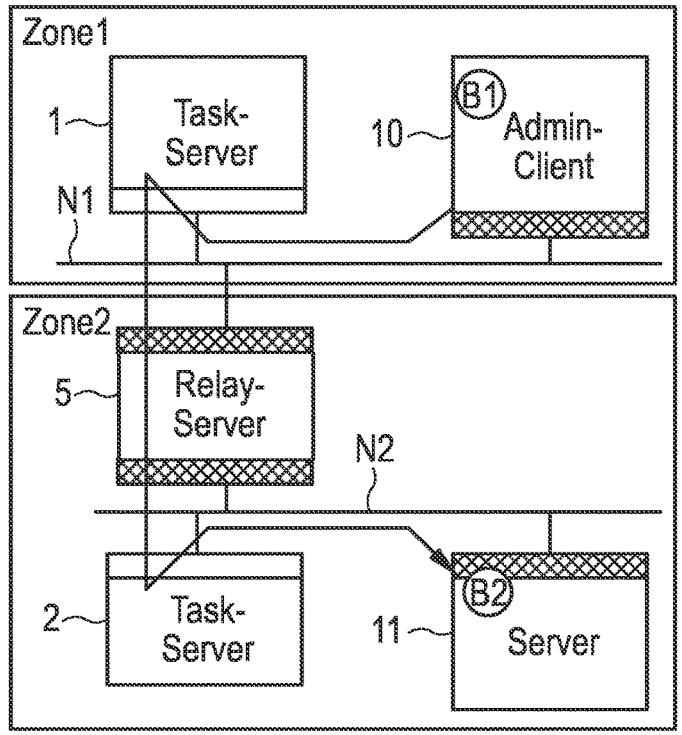
FIG. 2B is a schematic illustration of a computer network infrastructure according to FIG. 2A with modified network paths.

FIG. 2B shows a variant of the configuration of FIG. 2A with a more simple network structure. In FIG. 2B, both the admin client 10 and the task server 1 in zone 1 are directly connected to the relay server 5 of zone 2 via a first network N1. Within the zone 2, the server 11 as well as the task server 2 are connected to the relay server 5 via a second network N2. Thus, the topology according to FIG. 2B, in contrast to the topology of FIG. 2A, merely comprises two different networks. A transport of data packets or task files from the admin client 10 to the server 11 via the task server 1, relay server 5 and the task server 2 (see steps B1 and B2) can be done in analogy to the course explained above according to FIG. 2A. The only difference is that a transport in zone 1 is merely effected via the only network N1 and in zone 2 merely via the only network N2.

Figure 3:
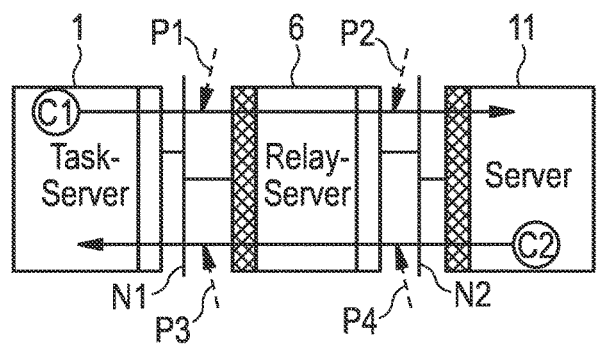
FIG. 3 is a schematic illustration of a part of computer network infrastructure using multiple transmission protocols.

FIG. 3 shows a schematic illustration of at least a part of a computer network infrastructure comprising a task server 1, a relay server 6 as well as a server 11 as a processing computer system. Task server 1 and relay server 6 are connected via a first network N1, while relay server 6 and server 11 are connected via a second network N2. As already described above in the context of FIGS. 2A and 2B, the server 11 is an encapsulated system with closed network ports so that server 11 can not be externally addressed for a connection establishment via a running program or a running service.

The relay server 6 is different from a relay server 5 according to the explanations of FIGS. 1 to 2B in that the relay server 6 according to FIG. 3 comprises network ports closed merely toward the task server 1 (i.e. to the network N1). This is indicated by a cross-hatched communication level in the direction of network N1 at the relay server 6.

In the direction of the server 11, i.e. in the direction of the network N2, the relay server 6 comprises at least one open network port so that the relay server 6 is addressable from server 11 via a running service via network N2 and a connection establishment is possible from server 11.

Thus, according to FIG. 3, the relay server 6 is a mixed open and closed system, or a hybrid broker computer system between task server 1 and server 11, respectively. Such a configuration is required in the structure according to FIG. 3 so that the server 11 and the relay server 6 are capable of communicating with one another via network N2. If the relay server 6 had all network ports closed in the direction of network N2 (as is the case toward network N1), data could not be exchanged between the relay server 6 and the server 11 since connection establishment to the respective other computer system is not possible from both sides.

According to the configuration of FIG. 3, a transport of data packets in a first transmission direction C1 from the task server 1 to the relay server 6 and from the relay server 6 to the server 11 is effected such that first task server 1 performs a port-knocking on the closed network ports of the relay server 6 by network N1, whereupon the relay server 6 per se establishes a connection to the task server 1 and initiates fetching of the data packets from the task server 1 to the relay server itself.

The same is effected subsequently between the relay server 6 and the server 11, wherein the relay server 6 performs port-knocking at the closed network ports of the server 11 by the network N2 so that the server 11 per se is capable of addressing relay server 6 via network N2, establishes a connection and fetches data packets.

In the reverse transport direction C2 from the server 11 to the relay server 6 and finally to the task server 1, a direct transfer of data packets occurs without a required port knocking, since a reachable entity (relay server 6 and task server 1) is in each case present, which the respective computer system (server 11 or relay server 6) can access.

Advantageously, in the configuration in FIG. 3, various transmission protocols are used for the forwarding of data packets between individual computer systems. A first transmission protocol P1 is used in the transmission direction C1 between the task server 1 and the relay server 6, wherein the relay server 6 performs a change of the transmission protocol after fetching the data packets so that another transmission of data packets toward the server 11 is effected via a second transmission protocol P2.

Vice versa, in the transport direction C2, a transmission of data packets from the relay server 6 to the task server 1 is effected according to a third transmission protocol P3, while a transmission of data packets from the server 11 to the relay server 6 is effected via a fourth transmission protocol P4.

This way, a different transmission protocol (P1 to P4) is used depending on the direction (C1 and C2) in a respective transmission path in each case upstream and downstream the relay server 6. This way, it can be prevented that security problems in a single protocol may cause a failure of the security mechanisms within the computer network infrastructure. Rather, in each case both protocols used (see P1 and P2 or P3 and P4) would have to be attacked for the respective path (C1 and C2), which is significantly more unlikely or complicated than an attack to an individual protocol, and which thus provides higher security than the use of only a single protocol.

In contrast to the configuration according to FIG. 3, use of multiple relay servers 6, possibly mixed with relay servers 5 according to FIGS. 1 to 2B, is possible so that a variety of combination options along with a change of transmission protocols is possible to increase security within the computer network infrastructure even further.

Figure 4:
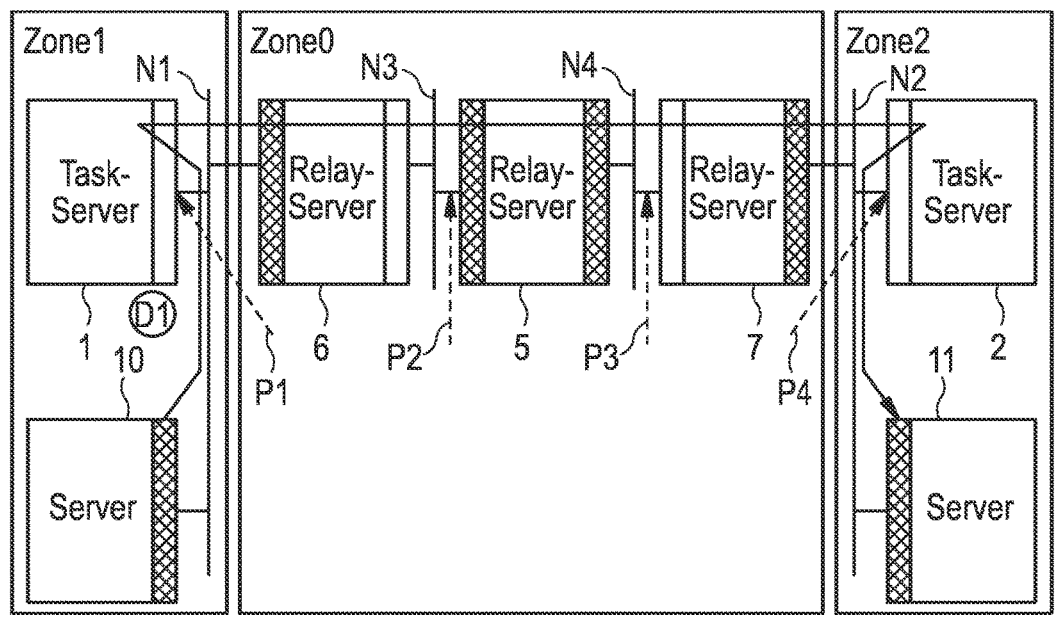
FIG. 4 is a schematic illustration of a computer network infrastructure having multiple security zones according to another configuration.

Such a configuration is illustrated in FIG. 4. A computer network infrastructure with a total of three security zones is shown. Three relay servers 5, 6 and 7 are located within one zone 0 (in the center), wherein a central relay server 5 is encapsulated in each case in both directions toward a network N3 and toward a network N4 and comprises closed network ports. This way, the relay server 5 as a central broker computer system forms a complete encapsulation in both transmission directions.

In contrast to the relay server 5, both other relay server 6, 7 as external broker computer systems are encapsulated for the transmission of data packets from zone 0 in the direction of zone 1 and in the direction of zone 2, respectively, in each case merely in the direction of a network N1 in zone 1 (see relay server 6) and in the direction of a network N2 in zone 2 (see relay server 7), respectively, and have closed network ports only in these directions (see cross-hatched input/output levels of the respective relay servers 5, 6 and 7 of zone 0.

However, the relay servers 6 and 7 comprise in each case one opened network port in the direction of the central relay server 5 so that the relay servers 6 and 7 are addressable for a communication with the relay server 5 at least via a running service from the relay server 5. Thus, zone 0 forms a central security zone, which mutually encapsulates both zones 1 and 2 (peripheral communication zones) by the configuration of the relay servers 5, 6 and 7. An attack to individual computer systems in one of the two zones (zone 1 and zone 2) can thus be blocked by the relay server of zone 0 and can not spread beyond zone 0 to the other zone (zone 1 or zone 2).

Such a security hurdle of zone 0 can be increased in that different transmission protocols P1 to P4 are used in the individual computer systems, in particular in the individual networks N1, N2, N3 and N4, respectively. If applicable, a change of transmission protocols can also be effected depending on the direction between individual computer systems according to FIG. 4. Specifically, in FIG. 4, use of a transmission protocol P1 within the network N1, a transmission protocol P2 within the network N3, a transmission protocol P3 within the network N4 and a transmission protocol P4 within network N2 is illustrated.

In the respective peripheral zones, zone 1 and zone 2 are configured in each case as a processing computer system, server 10 or server 11, as well as a broker computer system, task server 1 as well as task server 2. For example, a transmission of data packets from server 10 of zone 1 in the direction of server 11 in zone 2 can be initiated. To that end, the data packets are transmitted in a transmission direction D1 from server 10 directly to the task server 1 in zone 1. This is done via network N1. Subsequently, the relay server 6 of zone 0 fetches the data packets from task server 1 after a port knocking of the task server 1 toward the relay server 6, changes the transmission protocol from protocol P1 to protocol P2 and performs a port-knocking toward the relay server 5 in zone 0. Subsequently, the relay server 5 fetches the data packet from the relay server 6 using transmission protocol P2 within the network N3.

Since the relay server 7 is directly addressable for the relay server 5, the relay server 5 transmits the data packet according to a further changed transmission protocol P3 to the relay server 7 via the network N4. Furthermore, the relay server 7 transmits the data packet after another change of the protocol to a transmission protocol P4 by the network N2 to the directly addressable task server 2 of zone 2. Subsequently, the task server 2 performs a port-knocking toward server 11 via network N2, wherein server 11 addresses the task server 2 in a last step via network N2 and fetches the data packet.

Thus, FIG. 4 shows a hybrid computer network infrastructure by the use of hybrid broker computer systems, comprising addressable task servers 1 and 2, broker computer systems open and closed (addressable and not addressable) depending on the direction, relay servers 6 and 7 as well as a completely encapsulated (completely not addressable) broker computer system, namely relay server 5. Nevertheless, communication and forwarding of data packets is possible starting from a processing computer system, server 10 and server 11, in a zone 1 or 2 toward another processing computer system, server 10 or 11 of another zone, zone 1 or zone 2.

Advantageously, the three zones, zone 0, 1 and 2 are physically separated from one another and locked with respective access security systems. Advantageously, zone 0 is an area which must not be accessible by personnel of zone 1 or zone 2, respectively.

One possible attack scenario of a cracking (intrusion on an electronic data processing (EDV), level into a computer system of zone 1 or zone 2) is significantly complicated by multi-locked systems as well as different transmission protocols (in each case for a direct transmission and fetching of data packets). On a physical level, neither manipulative access to the network N1 in zone 1 nor access to the network N2 in zone 2 provide advantages for further attacking actions. A transport of data packets from the server 10 to server 11 is possible (as explained in the context of transmission direction D1 above). Transport in the reverse direction is effected analogously.

Figure 5:
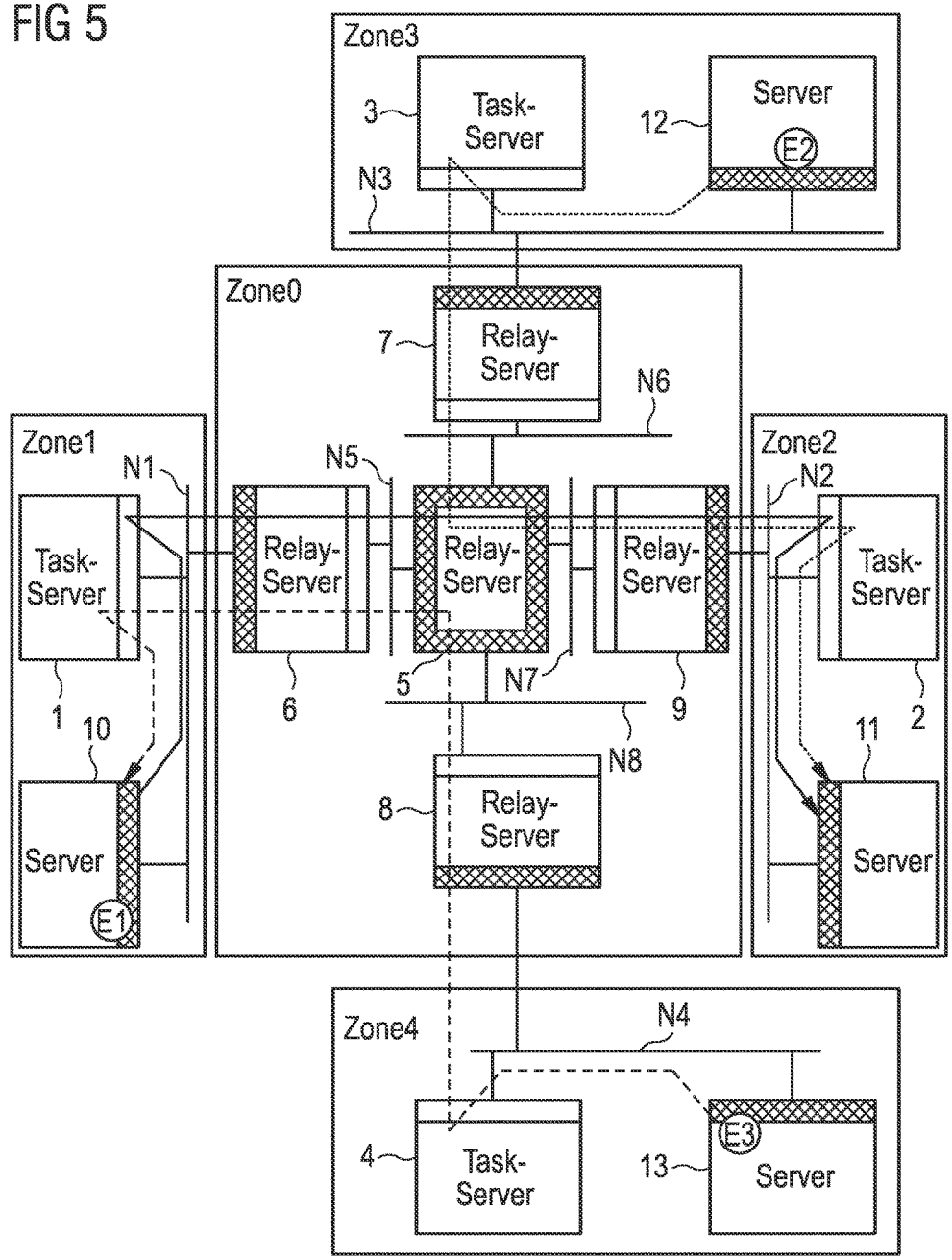
FIG. 5 is a schematic illustration of a computer network infrastructure having multiple security zones according to a further configuration.

FIG. 5 shows an encapsulation of a large number of zones in an exemplary manner for four zones, zone 1 to zone 4. Illustrated are a transport of data packets from a server 10 in zone 1 to a server 11 in zone 2 according to a method E1, a transport from a server 12 in zone 3 to the server 11 in zone 2 according to a method E2 as well as a transport from a server 13 in zone 4 to a server 10 in zone 1 according to a method E3.

In zone 0, which is centrally arranged in FIG. 5, five relay servers 5, 6, 7, 8 and 9 are arranged, wherein relay server 5 forms the center and keeps all network ports closed so that no connection establishment to the relay server 5 is possible via the respective networks N5, N6, N7 and N8. Vice versa, the relay server 5 is capable of addressing the other relay servers 6, 7, 8 and 9 in zone 0 via the corresponding networks, because the relay servers 6, 7, 8 and 9 keep at least one opened network port used for these purposes open with a running service for a connection establishment in the direction toward the relay server 5.

A communication in the structure according to FIG. 5 may thus be effected "star-shaped" from a peripheral zone inward in zone 0 or outward of zone 0 into the periphery. For example, data packets can be transported from server 10 of zone 1 to the relay server 6 in zone 0 by the network N1 via the task server 1, wherein the data packets, after a port-knocking of relay server 6 toward relay server 5, after fetched by the latter via network N5 and are further transported accordingly. According to a transport method E1 from server 10, for example, a data packet would be transmitted from relay server 5 to the relay server 9 via network N7 and transported from relay server 9 to the task server 2 in zone 2. Then, the data packet can be fetched from there by the server 11 via the network N2. An analogous transport of data packets is effected analogously, pursuant to the transport routes E2 illustrated in FIG. 5 from server 12 in zone 3 and E3 from server 13 in zone 4.

The connection of the four security zones exemplary illustrated in FIG. 5 to a central broker zone 0 is effected in a star, the center of which is formed by the encapsulated relay server 5. The statements discussed in the context of FIG. 4 in terms of security against physical and logic attacks also apply to the configuration illustrated in FIG. 5. A star-shaped configuration according to FIG. 5 requires very few resources compared to the configuration according to FIG. 4 and nevertheless enables a satisfactory transport of data packets between different zones 1 to 4. For example, a server in a demilitarized zone (DMZ), other servers, a region for operating personnel (operators), a region for a hardware control (e.g. of racks), a staging or the like can be considered as candidates for different security zones in a computing center.

Due to the completely encapsulated relay server 5, which forms the center and thus the core of all transmission paths between individual zones, security against a spread of attacks to computer systems of individual zones to other security zones is ensured. As already described with respect to the preceding figures, the relay server 5 forms an essential blockage against an undesired attack to computer systems located downstream in the transmission path. This way, an attack scenario is significantly complicated or unlikely by the cascaded interplay of multiple relay servers within the zone 0.

Figure 6:
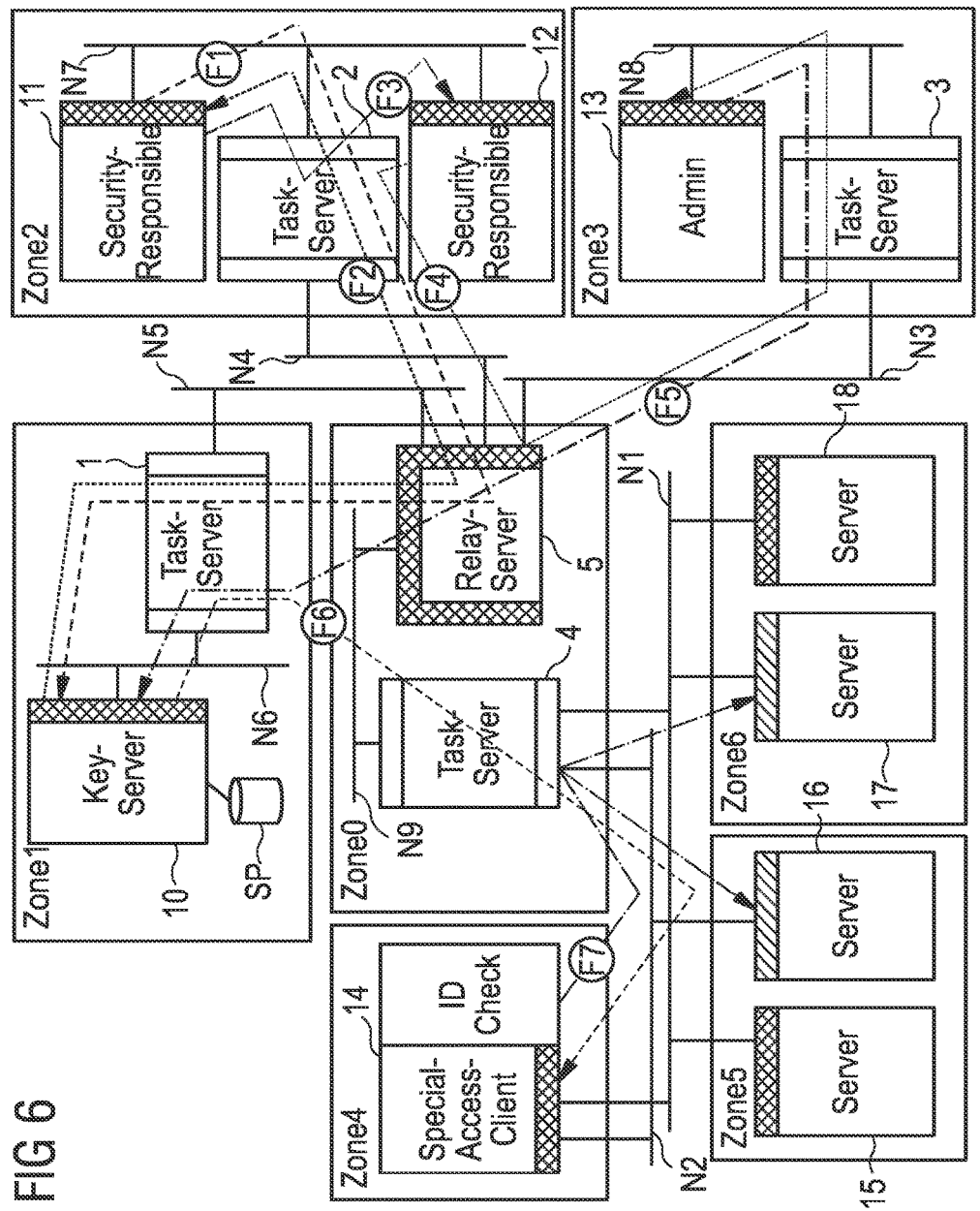
FIG. 6 is a schematic illustration of a computer network infrastructure having various security zones for a secure access to a computer system.

FIG. 6 shows a schematic illustration of a computer network infrastructure with different security zones, which are connected by a structure of hybrid broker computer systems, as described in the context of FIGS. 1 to 5.

A method for a secured access to a processing computer system of the computer network infrastructure according to FIG. 6 will be explained hereinafter using a communication and forwarding of data packets between secured computer systems illustrated in the preceding figures.

The computer network infrastructure according to FIG. 6 comprises a total of seven security zones, zone 0 to zone 6, wherein each zone comprises one or multiple processing computer systems with entirely closed network ports (prevention of a connection establishment from the exterior). Zones 0, 1, 2 and 3 additionally comprise in each case at least one broker computer system with at least one network port opened to that end for an external addressability and connection establishment for the exchange of data packets between processing computer systems within a security zone or for the transport of data packets via networks in other security zones. The zones 4, 5 and 6 do not have a broker computer system of their own. For these zones, this task is assumed by the broker computer systems in zone 0. Of course, this topology is merely exemplary. Other constellations are possible as well.

Computer systems with closed network ports are symbolized in FIG. 6 by cross-hatched input/output levels. Computer systems with at least one opened network port are symbolized by bar-shaped input/output levels. Computer systems with temporarily selectively opened network ports (explanations below) are symbolized by hatched input/output levels.

A zone 0 is centrally arranged and comprises a relay server 5 as well as a task server 4. The relay server 5 comprises the functionality as already described in the context of relay servers according to the FIGS. 1 to 5. In particular, the relay server 5 is entirely locked or encapsulated by closed network ports so that a connection establishment from the exterior to relay server 5 via network is not possible. However, vice versa, the relay server 5 is per se capable of addressing various broker computer systems (task server), which keep at least one network port with a running service open, address it and initiate a connection establishment to it. Within zone 0, the relay server 5 is capable of accessing task server 4 via network N9. It is possible to realize the zone 0 in FIG. 6 according to a zone 0 of FIG. 5 for the further increase of security. In this case, zones 4, 5 and 6 of FIG. 6 would each have to be equipped with at least one broker computer system.

The communication within structure according to FIG. 6 is star-shaped from a peripheral security zone toward the center (zone 0) and into the periphery from there again.

The individual peripheral security zones will be explained hereinafter.

Zone 1:

A processing computer system in the form of a key server 10 with a storage SP connected thereto is disposed in zone 1. The key server 10 keeps all network ports closed and does not have any running service or running programs for a connection establishment from the exterior. The key server 10 is one of multiple security entities. Routing information for an automated routing within the computer network infrastructure are stored in the key server 10. Optionally, the key server 10 stores person-related security data, identification data or other keys, passwords or the like. Furthermore, the key server 10 administers optionally predefined "form data" for the generation of an automated process for access to a secured computer system within the computer network infrastructure. As an alternative, the mentioned data is generated during a routing in another processing computer system for temporary purposes or input by a user. All data can be transmitted in encrypted form if need be, e.g. using a homomorphous encryption.

The key server 10 is capable of communicating with the task server 1 via a network N6 within zone 1 to store data packets on the task server and to fetch them from there. Zone 1 connects to zone 0 via network N5.

Zone 2:

Zone 2 comprises two processing computer systems, which in FIG. 6 are declared as security responsible 11 and security responsible 12. These two systems each keep all network ports closed and are not available via network (similar to the key server 10 of zone 1). Security responsible 11 and 12 are further security entities. These may, for example, fetch predetermined security and authentication files (from the key server 10 by a routing), locally process them and distribute them further in the structure. However, security responsible 11 and 12 may per se generate security and authentication files or can be input by a user and further distribute them in the process along a routing. For example, security responsible 11 and 12 serve for assigning and setting security criteria for a secured access to a processing computer system within the computer network infrastructure.

For a communication and forwarding of data packets, security responsible 11 and 12 are connected to a task server 2 within zone 2 via network N7, which per se keeps at least one network port open so that security responsible 11 and 12 are capable of accessing task server 2 and establishing a connection to fetch data packets, for example. Zone 2 is connected to zone 0 via a network N4.

Zone 3:

In zone 3, a processing computer system is configured in the form of an admin 13, which comprises closed network ports and is connected to a task server 3 via network N8 for fetching and transmitting data packets. Admin 13 also is a security entity which may, for example, set a predetermined user group of persons for dedicated access to a processing computer system within the computer network infrastructure. Zone 3 connects to zone 0 via a network N3.

Zone 4:

According to FIG. 6, zone 4 is the actual access zone for access to a processing computer system and comprises a processing computer system, namely a so-called special access client 14. This client includes closed network ports and is an access computer system for access to another processing computer system within the computer network infrastructure. The special access client 14 may be a computer, for example, which is secured, i.e. is located in an especially protected area. Furthermore, common security measures (file system encryption) may be provided. Furthermore, the special access client 14 may be additionally protected from prohibited physical access by further physical security measures. By way of example, zone 4 connects to zone 0 via a network N2.

Zone 5:

At the same time, network N2 also provides connection to zone 5, which is configured as a first server zone with two servers 15, 16 in FIG. 6.

Zone 6:

Another server zone (zone 6), exemplary comprising two further servers 17, 18, connects to both zone 0 and zone 4 via a network N1.

The respective servers 15 to 18 of zone 5 and 6 form processing computer systems for local processing of predetermined data. For example, the servers 15 to 18 can be configured as database servers. Generally, servers 15 to 18 in the illustrated networks have closed network ports and are not externally addressable and suppress connection establishment, respectively. However, the servers can be unlocked in a dedicated manner so that selective opened servers can be accessed from zone 4 via special access client 14.

By way of example, such selectively opened servers are the server 16 of zone 5 and the server 17 of zone 6. Selective opening of a predetermined network port is symbolized by a simple hatched input/output level in these servers.

Hereinafter, a secured method of accessing servers 16 and 17 of zones 5 and 6 by the special access client 14 of zone 4 is explained by multiple method steps F1 to F7.

In a step F1, an initiation of a task for secured access to the two servers 16 and 17 of zone 5 and 6 is effected. To that end, the security responsible 11 of zone 2 sends a request file, which is transmitted to the key server 10 via the network N7, the task server 2, the network N4, by a port-knocking to relay server 5 and subsequent fetch by the relay server 5, as well as via network N5, task server 1 and network N6 (after a port knocking of task server 1 to key server 10 and subsequent fetch of the request file from task server 1 by key server 10).

In the key server 10 in zone 1, a corresponding "form" with set required steps for access to servers 16 and 17 of zone 5 and zone 6 by the special access client 14 in zone 4 is selected and corresponding security file is generated. This file is transmitted in a method step F2 from the key server 10 to the security responsible 11 in zone 2 via an inverse communication path via zone 0. The form can be filled in (possibly in an automated fashion) by the security responsible 11 in zone 2 and be supplemented by the required information (e.g. who, what, when has to do what for access to servers 16 and 17 of zone 5 and zone 6).

Subsequently, the security responsible 11 transmits the filled form to the security responsible 12 within the same zone 2 via the network N7 and the task server 2 in step F3.

The security responsible 12 may then supplement the transmitted security file by further required security information, agree to the already entered security information and/or sign the security file with a private key.

In a further step F4, the supplemented, processed and/or signed security file is transmitted from the security 12 of zone 2 via network N7, task server 2, network N4, relay server 5 in zone 0, network N3, task server 3 in zone 3 and network N8 there to the admin 13. In this processing computer system, the security file is processed further. This includes, for example, a further confirmation of security information within the security file, incorporation of further access information (e.g. who out of a user group is to have dedicated access) or the like.

For example, admin 13 can select two predetermined administrators by the transmitted security file and the access criteria set therein, who are to obtain specific access to the servers 16 and 17 by the special access client 14. As an alternative, a setting of authorized administrators may already be set in the security file, which is to be re-confirmed by the admin 13. In this case, admin 13 would not have any further rights. Admin 13 stores this information in the security file and transmits it to the key server 10 in a further step F5 by network N8, task server 3, network N3, relay server 5 in zone 0, network N5, task server 1 in zone 1 and network N6 there. Biometric data of potential authorized persons is stored in the key server 10 or the storage SP, for example. This biometric data may include fingerprints, hand vein scans, retinal scans, voice patterns or the like, i.e. personal biometric identification data of natural persons.

However, it is also possible that another computer system of the computer network infrastructure assumes the storage of such biometric data. For example, in FIG. 6, this is the key server 10 as a possible security entity.

In the key server 10, the biometric data of the two administrators is selected by the transmitted security file, which has been selected for access by admin 13 in zone 3 and set. This biometric data is transmitted to the special access client 14 in zone 4 together with or embedded in the security file by network N6, task server 1, network N5, relay server 5 in zone 0, network N9, task server 4 as well as network N2 in a step F6.

A requesting of authentication information and a verifying of this requested authentication information by biometric data stored in the security file is effected as further measures in the special access client 14.

To that end, the special access client 14 provides a terminal, on which biometric data can be read and/or passwords can be prompted. The passwords may be a further security criterion, which were communicated to the two administrators, who are to have access to servers 16 and 17, in advance by a separate medium independently from the system/process described herein (e.g. on paper). In this way, the two administrators need to authenticate on special access client 14 after getting through a physical access control (e.g. in a high-security rack), which may prompt authentication just as well. If the prompted authentication information matches the information contained in the security file, the administrators are authenticated at the special access client 14.

However, for access to the servers 16 and 17 in zone 5 and 6, another security hurdle is to be jumped. Servers 16 and 17 have originally closed network ports and are not externally addressable just like servers 15 and 18 in the respective zones 5 and 6 so that connection establishment is not possible to servers 16 and 17. Thus, a selective unlocking is required for access to servers 16 and 17.

After a successful authentication of the administrators at the special access client 14 in zone 4, an access instruction is transmitted from the special access client 14 to the task server 4 in zone 0 via network N2 in step F7. This task server 4 performs port-knocking toward server 16 via network N2 or toward server 17 via network N1 so that the servers 16 and 17 are capable of fetching and locally executing the access instruction. This may include a re-verification of security information, for example.

Subsequently (in a positive re-verification of security information), a selective network port is unlocked in the respective servers 16 and 17 for access by the special access client 14 of zone 4. Advantageously, such access is restricted to the IP address of the special access client 14, possibly in combination with a certain source port. A selectively opened network port at server 16 and 17 is symbolized by a hatched communication level.

Subsequently, the administrators on the special access client 14 in zone 4 can access the selectively opened servers 16 and 17 via networks N2 or N1 to perform maintenance work, verify applications, recover data or the like, for example.

The method of accessing ends here.

After a performed access, which may be time-limited (settings in advance, e.g. within the security file), the selective opened network port at the respective servers 16 and 17 is closed again so that the servers 16 and 17, just like the servers 15 and 18 in the respective zones 5 and 6, are encapsulated again so that a connection establishment from the exterior is no longer possible. This restores the original state of the computer network infrastructure according to FIG. 6.

In this way, communication and forwarding of security files for secured access to individual processing computer systems is possible by a structure of hybrid broker computer systems, which are divided into a plurality of security zones by a relay server 5.

All of the illustrated structures, topologies and arrangements of computer systems within the computer network infrastructure according to FIGS. 1 to 6 are merely exemplary and illustrated in a simplified manner. Possible scenarios of firewalls and similar systems (e.g. so-called intrusion detection systems", IDS, or "intrusion prevention systems", IPS, are omitted in the illustrations according to FIGS. 1 to 6. However, use of such systems comes with advantages.

The invention claimed is:

1. A method of communicating between secured computer systems in a computer network infrastructure, comprising:
    transmitting data packets between a plurality of processing computer systems by at least one broker computer system, wherein the data packets are routed via at least one relay system connected upstream or downstream of the broker computer system in a transmission path of the data packets,
    causing all processing computer systems from the group of the processing computer systems to at least temporarily keep predetermined network ports used for the method closed such that a connection establishment from the exterior is not permitted and thus access to a respective processing computer system via a network by the network ports is prevented, and
    causing the relay system to keep predetermined network ports used for the method closed at least toward the broker computer system, to which the relay system is connected upstream or downstream such that a connection establishment to the relay system is not permitted at least from the broker computer system and thus a corresponding access to the relay system via network by the network ports is prevented,
    wherein a processing computer system or the relay system are capable of establishing a connection to the broker computer system to store a data packet in the broker computer system or to fetch it from there, and
    in the group of the processing computer systems it is discriminated between at least:
    one key computer system,
    one access computer system, and
    one target computer system,
    and the method further comprises:
        generating a security file for a secured access to the target computer system in the key computer system,
        transmitting the security file from the key computer system to the access computer system along a defined communication path by the at least one broker computer system and the at least one relay system,
        verifying authentication information requested in advance by the access computer system using the security file, and
        unlocking a selective network port of the target computer system for an access by the access computer system, if the verification of the authentication information by the access computer system has been successful.

2. The method according to claim 1, wherein the relay system connects directly upstream or downstream of a processing computer system in the transmission path of the data packets and the relay system has at least one network port open toward the processing computer system so that this processing computer system is capable of establishing a connection to the relay system to store a data packet in the relay system or to fetch it from there.

3. The method according to claim 1, wherein the relay system, via which the data packets are routed, interconnects between two broker computer systems in the transmission path of the data packets, and
    the relay system keeps predetermined network ports used for the method closed toward at least one of the broker computer systems that the relay system is connected between.

4. The method according to claim 1, wherein the data packets are routed via multiple relay systems connected immediately one after the other in a transmission path of the data packets, wherein between each of the two relay systems one of the relay systems has at least one network port open toward the other relay system, and access to the relay system is effected by the opened network port for forwarding the data packets.

5. The method according to claim 1, wherein the data packets
are transmitted in the transmission path upstream the/a relay system by at least one first transmission protocol, and
are transmitted in the transmission path downstream the/a relay system by at least one second transmission protocol different from the at least one first transmission protocol.

6. The method according to claim 1, wherein the data packets are transmitted in the respective transmission path between two processing computer systems via different transmission protocols depending on the direction.

7. The method according to claim 1, wherein the transmission of the data packets to the/a relay system or to a processing computer system comprises:
sending a predetermined data sequence to the relay system or the processing computer system, wherein the predetermined network ports of the relay system or of the processing computer system are closed and wherein the data sequence addresses one or multiple network ports of the relay system or of the processing computer system in a predetermined order,
verifying the sent data sequence with a predefined sequence in the relay system or in the processing computer system, and
causing the transmission of the data packets by the relay system or by the processing computer system if the verification of the sent data sequence is positive, wherein the relay system or the processing computer system per se establishes a connection to the broker computer system and fetches the data packets.

8. The method according to claim 1, wherein, in the group of the processing computer systems, discrimination is additionally made regarding at least one authorization computer system and the method further comprises:
transmitting the security file to the authorization computer system,
supplementing the security file by predetermined access information and/or signing the security file in the authorization computer system, and
transmitting the security file further in the communication path toward the access computer system.

9. A computer network infrastructure comprising:
a group of processing computer systems,
at least one broker computer system, and
at least one relay system,
wherein the computer network infrastructure is configured such that data packets are transmittable along a predetermined transmission path between multiple processing computer systems by the broker computer system and the relay system,
the relay system connects upstream or downstream of the broker computer system in the transmission path of the data packets,
all processing computer systems comprise in each case an access control unit configured to keep predetermined network ports used for the method at least temporarily closed such that a connection establishment from the exterior is not permitted and thus access to a respective processing computer system via a network by the network ports is prevented,
the relay system is configured to keep predetermined network ports used for the method closed at least toward the broker computer system, the relay system connected upstream or downstream to said broker computer system such that a connection establishment to the relay system is not permitted at least from the broker computer system and thus a corresponding access to the relay system via a network by the network ports is prevented, and
the processing computer systems and the relay system are configured to establish a connection to the broker computer system to store a data packet in the broker computer system or to fetch it from there, the group of the processing computer systems comprises at least
one key computer system,
one access computer system, and
one target computer system,
wherein the key computer system is configured to generate a security file for a secured access to the target computer system and transmit the security file to the access computer system along a predetermined communication path by the at least one broker computer system and the at least one relay system, the access computer system is configured to prompt input of authentication information on the access computer system and to verify the authentication information using the security file, and
the target computer system is configured to unlock a selective network port for access to the target computer system by the access computer system depending on a verification of the authentication information by the access computer system.

10. The computer network infrastructure according to claim 9, wherein the relay system connects immediately upstream or downstream of a processing computer system in a transmission path of the data packets and the relay system is configured such that the relay system has at least one network port open toward the processing computer system so that this processing computer system is capable of establishing a connection to the relay system to store a data packet in the relay system or to fetch it from there.

11. The computer network infrastructure according to claim 9, comprising at least two broker computer systems, wherein the relay system connects between the broker computer systems in the transmission path of the data packets, and the relay system is configured to keep predetermined network ports used for the method closed at least towards one of the broker computer systems that the relay system is connected between.

12. The computer network infrastructure according to claim 9, comprising multiple relay systems connected directly one behind the other in a transmission path of the data packets, wherein the relay systems are configured such that between respective two relay systems one of the relay systems has at least one network port open toward the other relay system so that access to this relay system is possible using the opened network port for the transmission of the data packets.

13. The computer network infrastructure according to claim 9, wherein the computer network infrastructure is configured such that data packets are transmittable in the transmission path upstream the/a relay system and downstream the/a relay system using different transmission protocols.

14. The computer network infrastructure according to claim 9 configured to perform a method comprising:

transmitting data packets between a plurality of processing computer systems from a group of processing computer systems by at least one broker computer system, wherein the data packets are routed via at least one relay system connected upstream or downstream of the broker computer system in a transmission path of the data packets, causing all processing computer systems from the group of the processing computer systems to at least temporarily keep predetermined network ports used for the method closed such that a connection establishment from the exterior is not permitted and thus access to a respective processing computer system via a network by the network ports is prevented, and causing the relay system to keep predetermined network ports used for the method closed at least toward the broker computer system, to which the relay system is connected upstream or downstream such that a connection establishment to the relay system is not permitted at least from the broker computer system and thus a corresponding access to the relay system via network by the network ports is prevented, wherein a processing computer system or the relay system are capable of establishing a connection to the broker computer system to store a data packet in the broker computer system or to fetch it from there.

15. The computer network infrastructure according to claim 9, wherein the group of the processing computer systems further comprises at least one authorization computer system configured to supplement the security file with predetermined access information and/or sign the security file after a transmission of the security file to the authorization computer system as well as to transmit the security file further in the communication path.

16. A non-transitory computer program product configured to be executed within a respective hardware processor on at least one computer system and, when executed within the respective hardware processor, performs a method of communicating between secured computer systems in a computer network infrastructure, comprising:

transmitting data packets between a plurality of processing computer systems from a group of processing computer systems by at least one broker computer system, wherein the data packets are routed via at least one relay system connected upstream or downstream of the broker computer system in a transmission path of the data packets, causing all processing computer systems from the group of the processing computer systems to at least temporarily keep predetermined network ports used for the method closed such that a connection establishment from the exterior is not permitted and thus access to a respective processing computer system via a network by the network ports is prevented, and causing the relay system to keep predetermined network ports used for the method closed at least toward the broker computer system, to which the relay system is connected upstream or downstream such that a connection establishment to the relay system is not permitted at least from the broker computer system and thus a corresponding access to the relay system via network by the network ports is prevented, wherein a processing computer system or the relay system are capable of establishing a connection to the broker computer system to store a data packet in the broker computer system or to fetch it from there, and in the group of the processing computer systems it is discriminated between at least:

one key computer system, one access computer system, and one target computer system, and the method further comprises:

generating a security file for a secured access to the target computer system in the key computer system, transmitting the security file from the key computer system to the access computer system along a defined communication path by the at least one broker computer system and the at least one relay system, verifying authentication information requested in advance by the access computer system using the security file, and unlocking a selective network port of the target computer system for an access by the access computer system, if the verification of the authentication information by the access computer system has been successful.

\* \* \* \* \*